US009478773B2

(12) United States Patent
Kang et al.

(10) Patent No.: US 9,478,773 B2
(45) Date of Patent: Oct. 25, 2016

(54) BATTERY CELL OF ASYMMETRIC STRUCTURE AND BATTERY PACK EMPLOYED WITH THE SAME

(71) Applicant: LG Chem, Ltd., Seoul (KR)

(72) Inventors: Kyoung Won Kang, Daejeon (KR); Hyun Chul Jung, Daejeon (KR); Ki Woong Kim, Daejeon (KR); Sungjin Kwon, Daejeon (KR)

(73) Assignee: LG Chem, Ltd. (KR)

( * ) Notice: Subject to any disclaimer, the term of this patent is extended or adjusted under 35 U.S.C. 154(b) by 137 days.

(21) Appl. No.: 14/505,860

(22) Filed: Oct. 3, 2014

(65) Prior Publication Data

US 2015/0013151 A1 Jan. 15, 2015

Related U.S. Application Data

(60) Division of application No. 13/836,551, filed on Mar. 15, 2013, now Pat. No. 9,203,058, which is a continuation of application No. PCT/KR2013/002135, filed on Mar. 15, 2013.

(30) Foreign Application Priority Data

| Mar. 16, 2012 | (KR) | 10-2012-0026846 |
| Nov. 12, 2012 | (KR) | 10-2012-0127724 |

(51) Int. Cl.
| H01M 2/02 | (2006.01) |
| H01M 6/46 | (2006.01) |
| H01M 4/70 | (2006.01) |
| H01M 10/04 | (2006.01) |
| H01M 10/0565 | (2010.01) |
| H01M 10/0585 | (2010.01) |

(52) U.S. Cl.
CPC ............ *H01M 2/021* (2013.01); *H01M 2/024* (2013.01); *H01M 2/0212* (2013.01);

(Continued)

(58) Field of Classification Search
CPC .. H01M 2/021; H01M 2/0212; H01M 2/024; H01M 6/46; H01M 10/0413; H01M 10/0436; H01M 10/0565; H01M 10/0585
USPC ..................... 29/623.1–623.3; 429/153, 163
See application file for complete search history.

(56) References Cited

U.S. PATENT DOCUMENTS

| 2,702,310 A | 2/1955 | Kaye et al. |
| 3,442,717 A | 5/1969 | Horn et al. |

(Continued)

FOREIGN PATENT DOCUMENTS

| CN | 1314008 A | 9/2001 |
| CN | 1363121 A | 8/2002 |

(Continued)

OTHER PUBLICATIONS

Extended Search Report from European Application No. 13797719. 5, dated Feb. 12, 2016.

(Continued)

*Primary Examiner* — Karie O'Neill Apicella
(74) *Attorney, Agent, or Firm* — Lerner, David, Littenberg, Krumholz & Mentlik, LLP

(57) ABSTRACT

Disclosed herein is a battery cell configured to have a structure in which an electrode assembly including a separator disposed between a cathode and an anode is mounted in a battery case, wherein an asymmetric structure with respect to a central axis crossing the electrode assembly in plane is formed at a portion of at least one side of the electrode assembly constituting the outer circumference of the electrode assembly.

7 Claims, 14 Drawing Sheets

(52) U.S. Cl.
CPC .......... *H01M 2/0287* (2013.01); *H01M 4/70* (2013.01); *H01M 6/46* (2013.01); *H01M 10/0413* (2013.01); *H01M 10/0436* (2013.01); *H01M 10/0565* (2013.01); *H01M 10/0585* (2013.01); *H01M 2/0275* (2013.01); *H01M 2002/0297* (2013.01); *Y10T 29/4911* (2015.01); *Y10T 29/49108* (2015.01)

(56) References Cited

U.S. PATENT DOCUMENTS

| | | | |
|---|---|---|---|
| 4,092,464 A | 5/1978 | Dey et al. | |
| 4,964,877 A | 10/1990 | Keister et al. | |
| 5,633,097 A | 5/1997 | Miller | |
| 5,652,074 A | 7/1997 | Larson, III et al. | |
| 6,040,078 A * | 3/2000 | Fauteux | H01M 4/0442 429/163 |
| 6,224,995 B1 | 5/2001 | Fauteux et al. | |
| 6,300,002 B1 | 10/2001 | Webb et al. | |
| 6,498,951 B1 | 12/2002 | Larson et al. | |
| 6,610,443 B2 | 8/2003 | Paulot et al. | |
| 6,946,220 B2 | 9/2005 | Probst et al. | |
| 7,285,334 B1 | 10/2007 | Yamashita et al. | |
| 7,479,349 B2 | 1/2009 | O'Phelan et al. | |
| 7,595,132 B2 | 9/2009 | Kang et al. | |
| 2001/0005561 A1 | 6/2001 | Yamada et al. | |
| 2002/0119367 A1 | 8/2002 | Watanabe et al. | |
| 2002/0122975 A1 | 9/2002 | Spillman et al. | |
| 2002/0160257 A1 | 10/2002 | Lee et al. | |
| 2003/0013012 A1 | 1/2003 | Ahn et al. | |
| 2003/0039883 A1 | 2/2003 | Notten et al. | |
| 2003/0077509 A1 | 4/2003 | Probst et al. | |
| 2005/0164094 A1 | 7/2005 | Kotato et al. | |
| 2005/0214642 A1 | 9/2005 | Kim et al. | |
| 2006/0172185 A1 | 8/2006 | Mimura | |
| 2006/0269842 A1 | 11/2006 | Ichinose et al. | |
| 2006/0275661 A1 | 12/2006 | Kim et al. | |
| 2006/0286456 A1 | 12/2006 | Fu et al. | |
| 2007/0054180 A1 | 3/2007 | Miyajima et al. | |
| 2007/0059595 A1 | 3/2007 | Endo et al. | |
| 2007/0099078 A1 | 5/2007 | Zhang et al. | |
| 2007/0202401 A1 | 8/2007 | Viavattine | |
| 2007/0218355 A1 | 9/2007 | Ryu et al. | |
| 2007/0287064 A1 | 12/2007 | Suzuki et al. | |
| 2008/0137890 A1 | 6/2008 | Petersen et al. | |
| 2009/0075168 A1 | 3/2009 | Lee | |
| 2009/0159582 A1 | 6/2009 | Chami et al. | |
| 2010/0047685 A1 * | 2/2010 | Lee | H01M 2/021 429/176 |
| 2010/0112451 A1 | 5/2010 | Shibutani et al. | |
| 2010/0279161 A1 | 11/2010 | Kang et al. | |
| 2010/0319187 A1 | 12/2010 | Kim et al. | |
| 2011/0052952 A1 | 3/2011 | Roh et al. | |
| 2011/0183183 A1 | 7/2011 | Grady et al. | |
| 2011/0274955 A1 | 11/2011 | Park et al. | |
| 2011/0287308 A1 | 11/2011 | Kim et al. | |
| 2012/0015223 A1 | 1/2012 | Bhardwaj et al. | |
| 2012/0015236 A1 | 1/2012 | Spare | |
| 2012/0107654 A1 | 5/2012 | Bhardwaj et al. | |
| 2012/0129037 A1 | 5/2012 | Hohenthanner et al. | |
| 2012/0135299 A1 | 5/2012 | Kwon et al. | |
| 2012/0156551 A1 | 6/2012 | Cho | |
| 2012/0183825 A1 | 7/2012 | Lee et al. | |
| 2012/0202105 A1 | 8/2012 | Shinyashiki et al. | |
| 2012/0225345 A1 | 9/2012 | Kim | |
| 2013/0019732 A1 | 1/2013 | Yotsumoto | |
| 2013/0108906 A1 | 5/2013 | Bhardwaj et al. | |
| 2013/0144167 A1 | 6/2013 | Lee et al. | |
| 2013/0344360 A1 | 12/2013 | Miyajama et al. | |
| 2014/0093762 A1 | 4/2014 | Goh et al. | |

FOREIGN PATENT DOCUMENTS

| | | |
|---|---|---|
| CN | 1799162 A | 7/2006 |
| CN | 101107736 A | 1/2008 |
| EP | 1309018 A2 | 5/2003 |
| EP | 1326680 A1 | 7/2003 |
| EP | 1416571 A1 | 5/2004 |
| JP | 02-056856 | 2/1990 |
| JP | 05-234598 | 9/1993 |
| JP | 06-260209 | 9/1994 |
| JP | 08-171930 | 7/1996 |
| JP | 09-063591 | 3/1997 |
| JP | 09-082361 | 3/1997 |
| JP | H10188938 A | 7/1998 |
| JP | 10-270014 | 10/1998 |
| JP | H10296879 A | 11/1998 |
| JP | 2000133317 A | 5/2000 |
| JP | 2001028275 A | 1/2001 |
| JP | 2001167743 A | 6/2001 |
| JP | 2001357892 A | 12/2001 |
| JP | 2002199910 A | 7/2002 |
| JP | 2002252023 A | 9/2002 |
| JP | 2002260600 A | 9/2002 |
| JP | 2002-343350 A | 11/2002 |
| JP | 2003217601 A | 7/2003 |
| JP | 2003523060 A | 7/2003 |
| JP | 2003234094 A | 8/2003 |
| JP | 2003303622 A | 10/2003 |
| JP | 2004111219 A | 4/2004 |
| JP | 3611765 B2 | 1/2005 |
| JP | 2005169728 A | 6/2005 |
| JP | 3680797 B2 | 8/2005 |
| JP | 2006127882 A | 5/2006 |
| JP | 2006134604 A | 5/2006 |
| JP | 2006236994 A | 9/2006 |
| JP | 2006-278331 A | 10/2006 |
| JP | 2007073207 A | 3/2007 |
| JP | 2008021634 A | 1/2008 |
| JP | 2008300141 A | 12/2008 |
| JP | 2009-218105 A | 9/2009 |
| JP | 2010176980 A | 8/2010 |
| JP | 2011003518 A | 1/2011 |
| JP | 2011-081931 A | 4/2011 |
| JP | 2011517831 A | 6/2011 |
| JP | 2011204613 A | 10/2011 |
| KR | 2020000005813 U | 4/2000 |
| KR | 20-0207948 | 1/2001 |
| KR | 1020010055968 A | 7/2001 |
| KR | 20010104150 A | 11/2001 |
| KR | 1020030066960 | 8/2003 |
| KR | 1020030066960 A | 8/2003 |
| KR | 20040054113 A | 6/2004 |
| KR | 20050020357 A | 3/2005 |
| KR | 20050036466 A | 4/2005 |
| KR | 20060027281 A | 3/2006 |
| KR | 100670492 B1 | 1/2007 |
| KR | 20070066401 A | 6/2007 |
| KR | 1020070075941 A | 7/2007 |
| KR | 1020070099068 A | 10/2007 |
| KR | 20080022915 A | 3/2008 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 A | 1/2009 |
| KR | 10-0884945 B1 | 2/2009 |
| KR | 20090028243 A | 3/2009 |
| KR | 20090062409 A | 6/2009 |
| KR | 20090097731 A | 9/2009 |
| KR | 100987300 B1 | 10/2010 |
| KR | 20100137290 A | 12/2010 |
| KR | 20110025023 A | 3/2011 |
| KR | 20110105737 A | 9/2011 |
| KR | 20110112241 A | 10/2011 |
| KR | 20110128594 A | 11/2011 |
| KR | 20120060706 A | 6/2012 |
| KR | 20120082808 A | 7/2012 |
| WO | 0072392 A1 | 11/2000 |
| WO | 0243178 A1 | 5/2002 |
| WO | 2012-009423 A1 | 1/2012 |
| WO | 2012053772 A2 | 4/2012 |

(56) References Cited

FOREIGN PATENT DOCUMENTS

| WO | 2013054593 A1 | 4/2013 |
|---|---|---|
| WO | 2013141279 A1 | 9/2013 |
| WO | 2013-180378 A1 | 12/2013 |

OTHER PUBLICATIONS

Chinese Office Action for Application No. 201380002792.X dated Apr. 3, 2015.

Machine translation of KR 2003-0066960 (Jang).
International Search Report for Application No. PCT/KR2013/002118 dated Jun. 28, 2013.
Inernational Search Report for Application No. PCT/KR2013/001815 dated Jun. 27, 2013.
International Search Report for Application No. PCT/KR2013/002127 dated Jun. 27, 2013.
International Search Report from PCT/KR2013/002102, dated Jun. 14, 2013.

\* cited by examiner (A)

BATTERY CELL OF ASYMMETRIC STRUCTURE AND BATTERY PACK EMPLOYED WITH THE SAME

CROSS-REFERENCE TO RELATED APPLICATIONS

The present application is a divisional of U.S. application Ser. No. 13/836,551 filed Mar. 15, 2013, which is a continuation of International Application No. PCT/KR2013/002135 filed on Mar. 15, 2013, which claims priority from Korean Application Nos. 10-2012-0026846 filed Mar. 16, 2012 and 10-2012-0127724 filed on Nov. 12, 2012, the disclosures of which are hereby incorporated herein by reference.

TECHNICAL FIELD

The present invention relates to a battery cell of an asymmetric structure and a battery pack including the same and, more particularly, to a battery cell configured to have a structure in which an electrode assembly including a separator disposed between a cathode and an anode is mounted in a battery case, wherein an asymmetric structure with respect to a central axis crossing the electrode assembly in plane is formed at a portion of at least one side of the electrode assembly constituting the outer circumference of the electrode assembly, and a battery pack including the same.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be classified as a cylindrical battery, a prismatic battery or a pouch-shaped battery. Based on the kind of an electrolyte, a lithium secondary battery may also be classified as a lithium-ion battery, a lithium-ion polymer battery or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

Generally, a pouch-shaped battery is a battery having an electrode assembly and an electrolyte in a pouch-shaped battery case, formed of a laminate sheet including a resin layer and a metal layer, in a sealed state. The electrode assembly mounted in the battery case is configured in a jelly-roll (wound) type structure, a stacked type structure or a combination (stacked/folded) type structure.

FIG. 1 is a view typically showing the structure of a pouch-shaped secondary battery including a stacked type electrode assembly.

Referring to FIG. 1, a pouch-shaped secondary battery 10 is configured to have a structure in which an electrode assembly 30, including cathodes, anodes and separators disposed respectively between the cathodes and the anodes, is mounted in a pouch-shaped battery case 20 in a sealed state such that a cathode lead 40 and an anode lead 41 electrically connected to cathode tabs 31 and anode tabs 32 of the electrode assembly 30 are exposed to the outside.

The battery case 20 includes a case body 21 having a depressed receiving part 23, in which the electrode assembly 30 is located, and a cover 22 integrally connected to the case body 21.

The battery case 20 is formed of a laminate sheet including an outer resin layer 20A constituting the outermost portion of the laminate sheet, an isolation metal layer 20B to prevent penetration of materials, and an inner resin layer 20C for sealing.

The cathode tabs 31 and the anode tabs 32 of the stacked type electrode assembly 30 are respectively coupled to the electrode leads 40 and 41 by welding. In addition, insulative films 50 are attached to the top and bottom of each of the electrode leads 40 and 41 to prevent the occurrence of a short circuit between a thermal welding device (not shown) and the electrode leads 40 and 41 and to achieve sealing between the electrode leads 40 and 41 and the battery case 20 when the upper end 24 of the case body 21 and the upper end of the cover 22 are thermally welded to each other using the thermal welding device.

In recent years, however, a new type of battery cell is required in accordance with a slim type design trend or various other design trends.

In addition, the above-mentioned battery cells are configured to have the same size or the same capacity to constitute a battery pack. For this reason, in order to manufacture a lightweight and thin battery pack in consideration of the design of a device, to which the battery pack is applied, it is necessary to reduce the capacity of the battery pack or modify the design of the device so that the size of the device is increased. Furthermore, electrical connection is complicated during modification of the design of the device, and therefore, it is difficult to manufacture a battery pack satisfying desired conditions.

Therefore, there is a high necessity for a battery cell that can be used depending upon the shape of a device, to which a battery pack is applied, while maintaining the capacity of the battery pack, and a battery pack including the same.

DISCLOSURE

Technical Problem

Therefore, the present invention has been made to solve the above problems, and other technical problems that have yet to be resolved.

Specifically, it is an object of the present invention to provide a battery cell having an asymmetric structure.

It is another object of the present invention to provide a battery cell manufacturing method that is capable of manufacturing the battery cell.

It is a further object of the present invention to provide a battery pack including the battery cell so that the battery pack can be variously constructed based on the design of a device, in which the battery pack is installed.

Technical Solution

In accordance with one aspect of the present invention, the above and other objects can be accomplished by the provision of a battery cell configured to have a structure in which an electrode assembly including a separator disposed between a cathode and an anode is mounted in a battery case, wherein an asymmetric structure with respect to a central axis crossing the electrode assembly in plane is formed at a portion of at least one side of the electrode assembly constituting the outer circumference of the electrode assembly.

The battery cell according to the present invention is formed so as to correspond to the design of a device to which the battery cell of the asymmetric structure is applied, and therefore, it is possible for the battery cell to be flexibly used so as to correspond to various shapes of the device while providing large capacity.

In a concrete example, the battery case may be formed of a laminate sheet including an outer resin layer constituting the outermost portion of the laminate sheet, an isolation metal layer to prevent penetration of materials, and an inner resin layer for sealing.

The battery cell according to the present invention may generally be configured to have a plate-shaped battery cell structure in which both electrode terminals are located at one side thereof, at opposite sides thereof, or at one side and a neighboring side thereof, i.e. a thin rectangular parallelepiped structure. The electrode assembly may be configured so that the outer circumference of the electrode assembly has four sides in plane. Preferably, the asymmetric structure includes a curved portion.

For example, the curved portion may be formed at least one of the four sides of the electrode assembly in plane. In this case, the curved portion may be formed at each opposite lateral side adjacent to the side (upper end side) at which electrode tabs are formed, at the upper end side or a lower end side, or at only one of the opposite lateral sides.

Specifically, the curved portion may include one or more successive arcs. In a concrete example, each of the arcs is curved toward an outside of the battery cell in a convex form.

In addition, the curved portion is an arc having a radius equivalent to 10 to 200% of a longer side of the electrode assembly. If the radius is too small, it may be difficult to manufacture the battery cell. On the other hand, if the radius is too large, it may be difficult to provide effects based on formation of the curved portion.

In the above structure, the curved portion may have various shapes. For example, the curved portion may be formed in the shape of a single arc having a given radius and center. Alternatively, the curved portion may be formed in the shape of two or more successive arcs having different radii and/or arc centers.

Specifically, in the curved portion including two or more successive arcs, the arcs constituting the curved portion are preferably configured such that the radius of each of the arcs is continuously decreased in one direction.

Meanwhile, the battery case may be configured to have a structure in which the inside of the battery case corresponds to the curved portion. Preferably, the curved portion of the inside of the battery case is formed by modifying the battery case. Also, it is not necessary for the curved portion of the battery case to have a shape and size fully coinciding with the shape and size of the curved portion of the electrode assembly. The shape and size of the curved portion of the battery case is not restricted so long as the curved portion of the battery case can prevent the occurrence of an internal short circuit due to movement of the electrode assembly.

In another concrete example, the battery case may be configured to have a structure in which the outside of the battery case corresponds to the curved portion. Specifically, the battery case may be configured to have a structure in which the outside of the battery case corresponds to the shape of the asymmetric electrode assembly having a deflection part formed at one side thereof.

Consequently, the battery cell including the battery case having the structure as described above may be manufactured based on various shapes of devices. In addition, the battery cell according to the present invention includes the outside corresponding to various shapes of devices, and therefore, the battery cell can be stably mounted in the respective devices.

The battery cell may be, for example, a pouch-shaped battery cell configured to have a structure in which the electrode assembly is mounted in a pouch-shaped battery case. However, the battery cell according to the present invention is not limited to the pouch-shaped battery cell.

Specifically, the pouch-shaped battery cell may be configured to have a structure in which an electrode assembly of a structure including a cathode, an anode, and a separator disposed between the cathode and the anode is mounted in a battery case formed of a laminate sheet including a resin layer and a metal layer in a state in which the electrode assembly is connected to electrode terminals protruding outward from the battery case.

Preferably, the battery cell is a lithium ion battery or a lithium ion polymer battery. However, the battery cell according to the present invention is not limited to the lithium ion battery or the lithium ion polymer battery.

In accordance with another aspect of the present invention, there is provided a battery cell manufacturing method to manufacture the battery cell with the above-stated construction.

The battery cell manufacturing method according to the present invention may include cutting a laminate sheet including a metal layer and a resin layer into an unfolded battery case form to prepare a battery case sheet, folding the battery case sheet with respect to a symmetrical axis to form a folded portion, applying external force to the folded portion from an inside to an outside of the folded portion to form a curved portion corresponding to a deflection part of one side of an electrode assembly, applying external force to an inside of the battery case sheet to form a receiving part, placing the asymmetric electrode assembly having the deflection part at one side thereof in the receiving part, and hermetically sealing the battery case sheet.

In the battery cell manufactured using the above method, the outside of the battery case corresponding to the curved portion may have a thickness less than that of a sealed portion of the battery case. Specifically, the outside of the battery case may have a thickness equivalent to 50 to 90% that of the sealed portion of the battery case.

In a concrete example, the unfolded battery case form is not particularly restricted so long as the shape of the battery case can be formed from the unfolded battery case form using the above method. Preferably, the unfolded battery case form corresponds to the shape of the battery case.

In addition, methods of applying the external force are not particularly restricted so long as a structure corresponding to the deflection part formed at one side of the asymmetric electrode assembly can be formed at the battery case. Preferably, the external force is applied using a deep drawing method.

In the battery cell manufacturing method according to the present invention, an asymmetric part of the battery case is formed using external force. As compared with the conventional battery case, therefore, the number of sides of the battery case to be sealed is reduced.

Specifically, the sealing is achieved using a thermal welding method. After the electrode assembly is placed in the battery case, the battery case is hermetically sealed. Also, it is necessary for the sides of the battery case sealed using the thermal welding method to have a width greater than that of those of the battery case formed using the deep drawing method.

In the battery cell manufacturing method according to the present invention, the number of the sealed sides of the battery case is reduced. As compared with the conventional battery case, therefore, it is possible to achieve a more stable sealing effect.

According to circumstances, the sides of the battery case formed using the deep drawing method may not be sealed using the thermal welding method. In this case, it is not necessary to provide the sides of the battery case formed using the deep drawing method with an additional width for thermal welding. Consequently, it is possible to manufacture a battery cell having a more compact structure.

In addition, the asymmetric part is located at one of the sides of the battery case formed using the deep drawing method, and therefore, it is possible to configure a battery case having a structure in which the outside of the battery case corresponds to the structure of the asymmetric electrode assembly. Consequently, the battery cell may flexibly correspond to various structures of devices and may be more stably mounted in the devices.

In accordance with a further aspect of the present invention, there is provided a battery pack including the battery cell with the above-stated construction, wherein the battery cell includes two or more battery cells.

In the battery pack according to the present invention, the battery cells may be electrically connected to each other in various manners according to the specifications of a device, to which the battery pack is applied. For example, the battery cells may be arranged vertically and/or horizontally.

In a concrete example, the vertically arranged (stacked) battery cells may have curved portions formed at the same position thereof.

In another concrete example, the horizontally arranged battery cells may have curved portions formed at outermost sides thereof, which are opposite to each other.

That is, the installation space of a conventional battery pack configured to have a rectangular parallelepiped structure is greatly limited and cannot be standardized due to installation position, shape and the like of a battery cell in consideration of a recent trend for various designs. On the other hand, the battery pack according to the present invention has a large capacity to size ratio, is formed in a novel shape, and can be very flexibly disposed, thereby solving the above problems.

In accordance with a further aspect of the present invention, there is provided a device including the battery pack with the above-stated construction as a power source.

A concrete example of the device, in which the battery pack according to the present invention can be used, may be selected from among a mobile phone, a portable computer, a smart phone, a smart pad, a netbook computer, a light electric vehicle (LEV), an electric vehicle, a hybrid electric vehicle, a plug-in hybrid electric vehicle and a power storage device, to which, however, the present invention is not limited.

The structure of the device and a method of manufacturing the device are well known in the art to which the present invention pertains, and therefore, a detailed description thereof will be omitted.

Advantageous Effects

As is apparent from the above description, the battery cell according to the present invention is configured to have a structure in which a curved portion providing an asymmetric structure is formed at a portion of at least one side of the electrode assembly constituting the outer circumference of the electrode assembly.

Consequently, it is possible to provide a battery cell having a flexible shape based on the design of a device during construction of a battery pack and having a compact structure that can be stably mounted in the device.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 2:
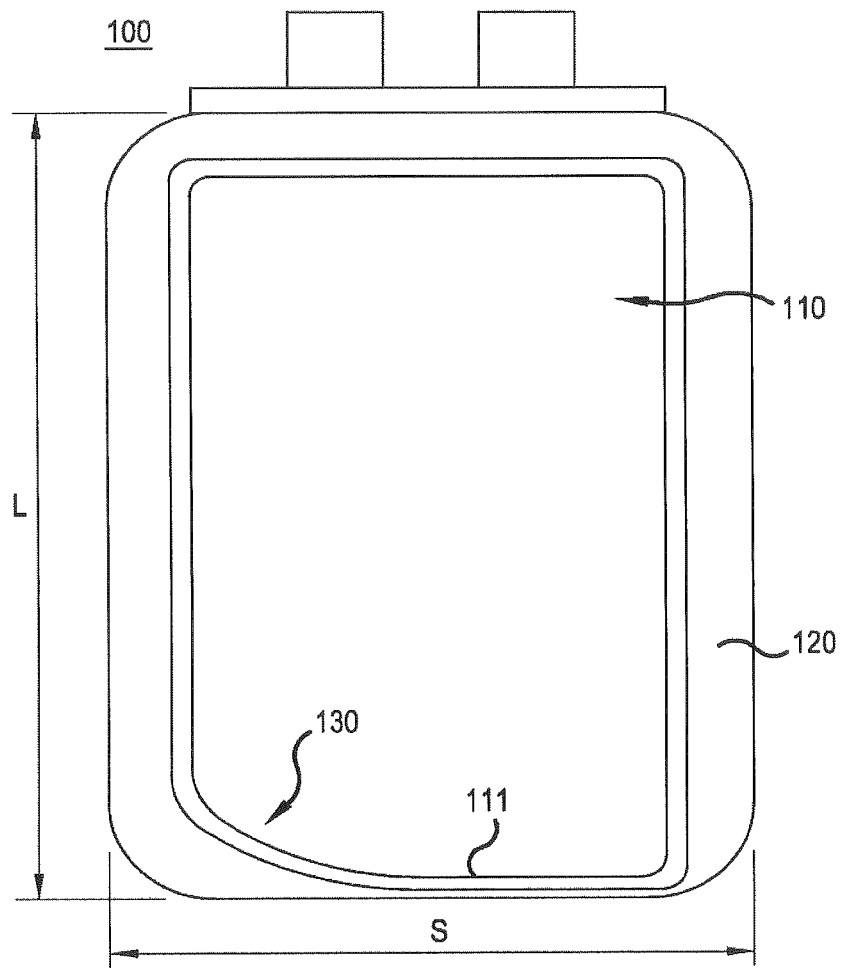
FIG. 2 is a plan view showing a battery cell according to an embodiment of the present invention.
Figure 2A:
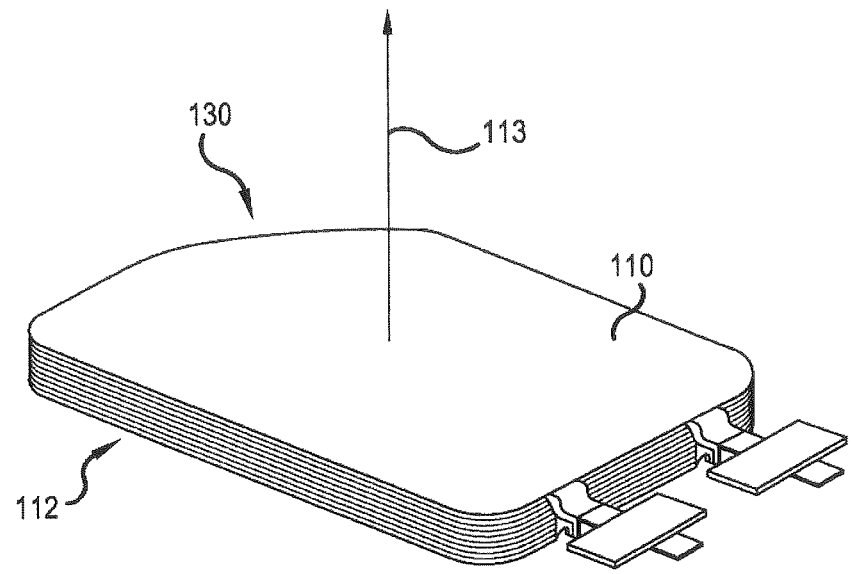
FIG. 2A is a perspective view showing an electrode assembly of the battery cell of FIG. 2.

FIG. 2 is a plan view typically showing a battery cell according to an embodiment of the present invention and FIG. 2A is a perspective view typically showing an electrode assembly of the battery cell of FIG. 2.

Referring to FIG. 2, a battery cell 100 is a battery cell configured to have a structure in which an electrode assembly 110 of a structure including a cathode, an anode, and a separator disposed between the cathode and the anode is mounted in a battery case 120. Generally, the battery cell 100 is configured to have a quadrangular plate-shaped structure in plane. That is, the battery cell 100 is configured to have a thin rectangular parallelepiped structure. A curved portion 130 providing an asymmetric structure is formed at a portion of one side 111 of the electrode assembly 110 constituting the outer circumference of the electrode assembly 110. The battery cell 100 includes a plurality of plate-shaped electrodes 112 including at least one cathode and at least one anode, which are separated from each other by a separator. The electrodes 112 are stacked along a vertical axis 113 extending upward from the bottom of the electrode assembly 110.

Each of the plate-shaped electrodes 112 has an asymmetric structure. The periphery or the outer circumference of each of the electrodes 112 is asymmetric in plane. The asymmetry is defined with respect to a vertical plane 114 of each of the electrodes 112.

Specifically, the curved portion 130 includes one or more arcs and, and each of the arcs is curved toward the outside of the electrode assembly 110 in a convex form. The curved portion 130 is configured to have a predetermined radius with respect to a width S or length L of the electrode assembly 110. In the drawing, the curved portion 130 includes two or more arcs having different radii and centers, and the radii of the arcs are continuously decreased in one direction. Alternatively, the curved portion 130 may be formed in the shape of a single arc having one radius and center.

Preferably, the curved portions 130 of the electrodes 112 overlap each other.

The battery case 120 is configured to have a structure in which the inside of the battery case 120 corresponds to the curved portion 130.

Figure 1:
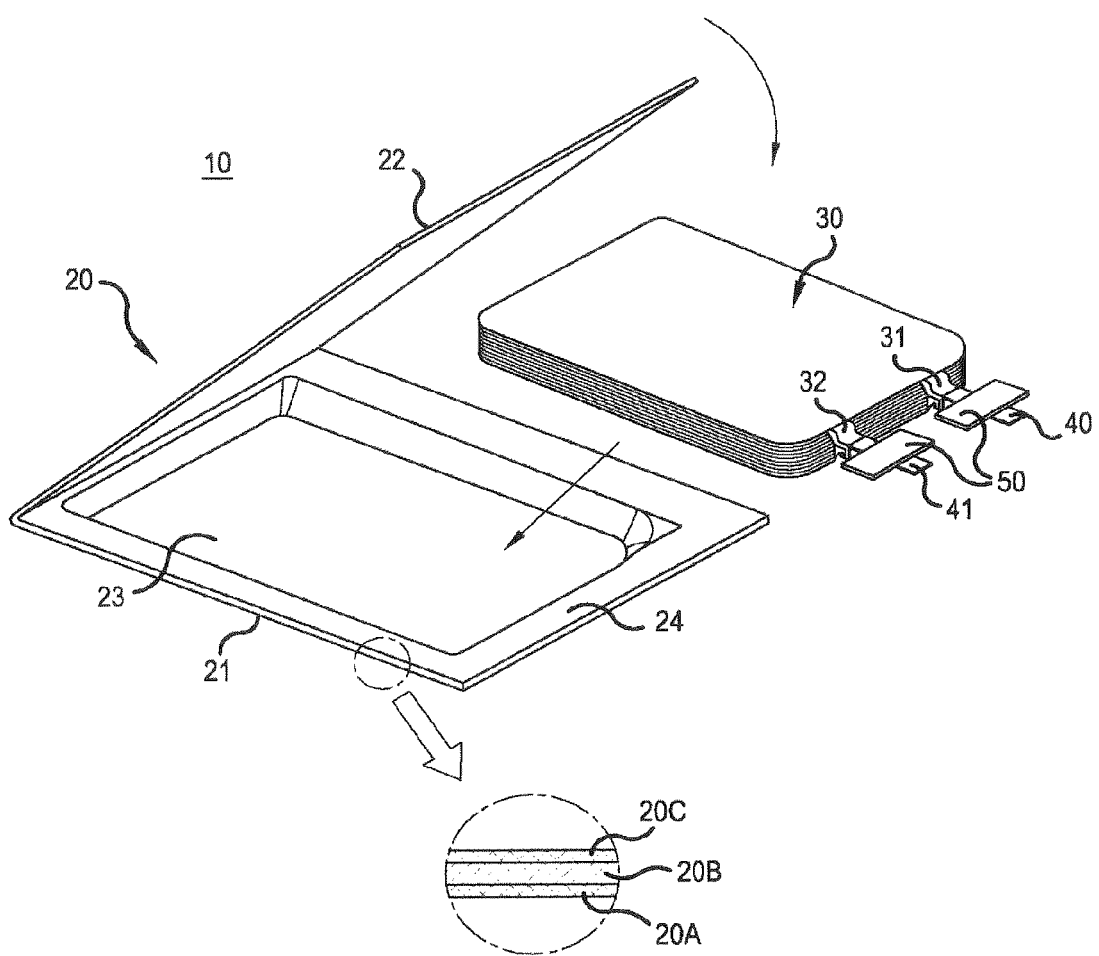
FIG. 1 is a perspective view showing a conventional battery cell.

Referring to FIGS. 1 and 2, the battery cell 100 may be manufactured by placing the electrode assembly 110 in the battery case 120 such that the curved portion 130 of the electrodes 112 corresponds to a portion of one side 111 of the battery case 120 constituting the outer circumference of the battery case 120, impregnating the electrode assembly 110 with an electrolyte, and hermetically sealing the battery case 120 according to the conventional manufacturing method of FIG. 1. In this case, a receiving part (not shown) of the battery case 120 is formed so as to correspond to the curved portion 130 of the electrode assembly 110.

Figure 3:
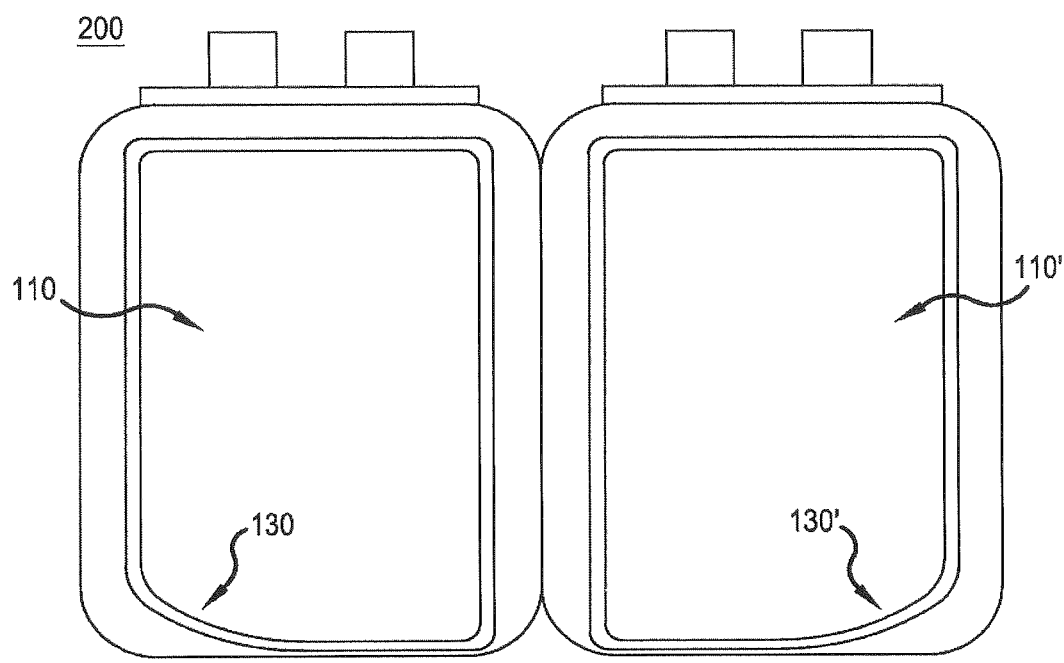
FIG. 3 is a plan view showing a battery pack according to an embodiment of the present invention.

FIG. 3 is a plan view typically showing a battery pack according to an embodiment of the present invention.

Referring to FIG. 3 together with FIG. 2, a battery pack 200 is configured to have a structure in which battery cells 100 and 100' of the battery pack 200 are arranged horizontally, and the battery cells 100 and 100' are mounted in a pack case (not shown) formed in a shape corresponding to the horizontal arrangement of the battery cells 100 and 100'.

Specifically, horizontally arranged battery cells 100 and 100' have curved portions 130 and 130' formed at outermost sides thereof, which are opposite to each other.

That is, it is possible for the battery pack according to the present invention to be very flexibly disposed in correspondence to devices having various shapes.

Figure 4:
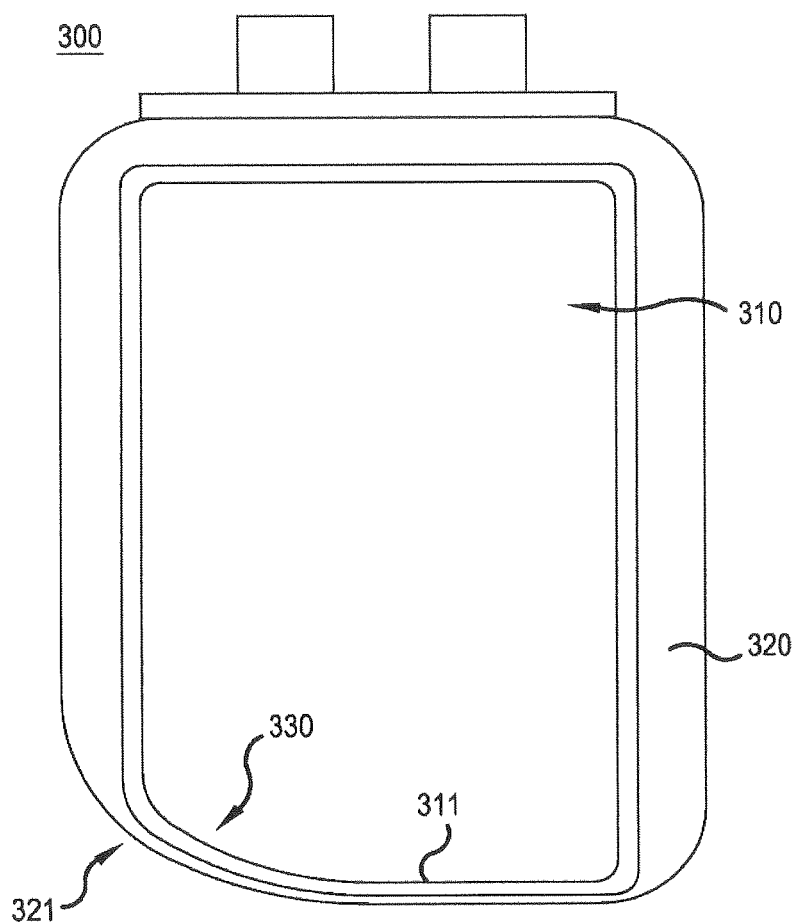
FIGS. 4 and 5 are plan views showing battery cells according to other embodiments of the present invention.
Figure 5:
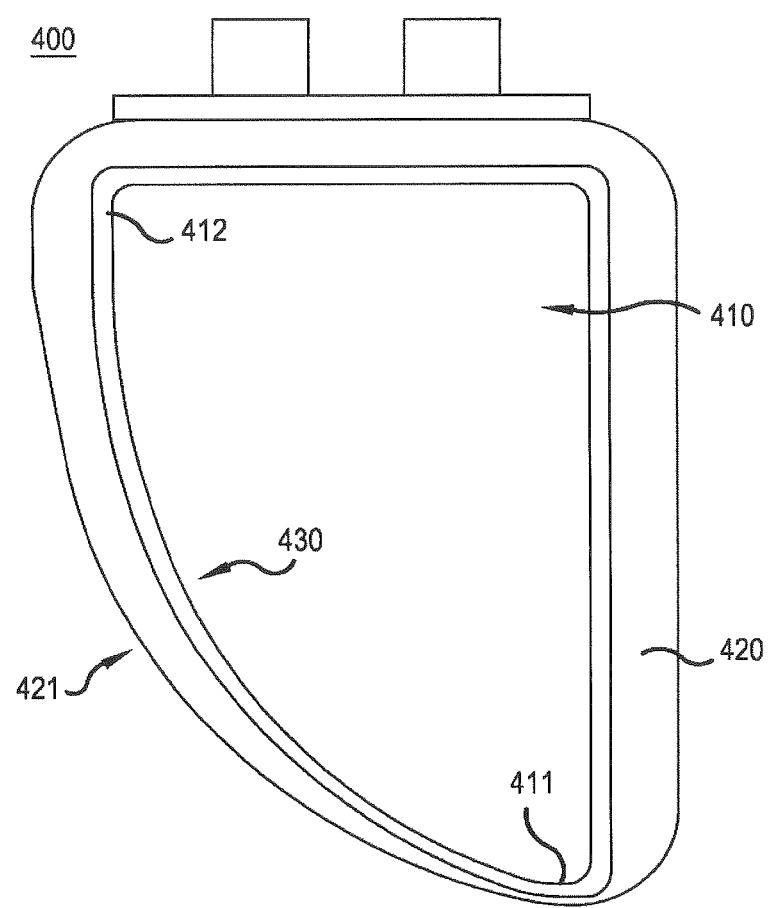

FIGS. 4 and 5 are plan views typically showing battery cells according to other embodiments of the present invention.

Referring to FIG. 4, a battery cell 300 is a battery cell configured to have a structure in which an electrode assembly 310 of a structure including a cathode, an anode, and a separator disposed between the cathode and the anode is mounted in a pouch-shaped battery case 320. Generally, the battery cell 300 is configured to have a plate-shaped structure in plane. A pair of electrode terminals may be formed at one side of the battery cell. The electrode terminals may be formed at opposite sides of the battery cell. Alternatively, one of the electrode terminals may be formed at one side of the battery cell and the other electrode terminal may be formed at another side adjacent to one side of the battery cell.

The electrode assembly 310 is configured to have a structure including a cathode, an anode, and a separator disposed between the cathode and the anode. The electrode assembly 310 may be a stacked type electrode assembly, which is manufactured by sequentially stacking a cathode sheet, a separator, and an anode sheet such that the separator is disposed between the cathode sheet and the anode sheet, a wound type electrode assembly, which is manufactured by sequentially stacking a sheet type cathode, a sheet type separator, and a sheet type anode and winding the sheet type cathode, the sheet type separator, and the sheet type anode such that the sheet type separator is disposed between the sheet type cathode and the sheet type anode, or a combination (stacked/folded) type electrode assembly, which is manufactured by arranging one or more polarized bodies selected from a group consisting of a cathode sheet, an anode sheet, and a stacked type electrode assembly on a sheet type separator and winding or folding the sheet type separator. The stacked/folded type electrode assembly may be manufactured using two or more sheet type separation sheets.

The stacked type electrode assembly may include a first unit cell configured to have a structure in which a cathode plate, an anode plate, and separator plates are laminated while being stacked such that the cathode plate or the anode plate and one of the separator plates are located at the outermost sides of the stacked type electrode assembly.

In addition, the stacked type electrode assembly may include a second unit cell configured to have a structure in which a cathode plate, an anode plate, and separator plates are laminated while being stacked such that the separator plates are located at the outermost sides of the stacked type electrode assembly.

For example, the first unit cell may be configured to have a structure in which a cathode plate, a separator plate, an anode plate, and a separator plate are laminated while being sequentially stacked or a structure in which an anode plate, a separator plate, a cathode plate, and a separator plate are laminated while being sequentially stacked.

The stacked type electrode assembly may include a third unit cell configured to have a structure in which a cathode plate, an anode plate, and a separator plate are laminated while being stacked in a state in which the separator plate is disposed between the cathode plate and the anode plate such that the cathode plate and the anode plate are located at the outermost sides of the stacked type electrode assembly.

The stacked type electrode assembly may include a fourth unit cell configured to have a structure in which a cathode plate or an anode plate and a separator plate are laminated while being stacked.

The stacked type electrode assembly may be configured to have a structure in which only first unit cells are stacked, a structure in which only second unit cells are stacked, a structure in which only third unit cells are stacked, a structure in which only fourth unit cells are stacked, or a structure in which the first, second, third, and fourth unit cells are combined.

The stacked type electrode assembly may be configured to have a structure in which only the first unit cells are stacked.

The second unit cell may be stacked at the uppermost end or the lowermost end of the first unit cell.

In the structure in which only the second unit cells are stacked, a cathode plate or an anode plate may be disposed between the second unit cells.

A fixing member to more securely maintain the stack structure of the cathode plate, the separator plate, and the anode plate may be added to the first unit cell to the fourth unit cell.

The fixing member may be an additional external member different from the first unit cell to the fourth unit cell. The fixing member may be an adhesive tape or a bonding tape to cover a portion or the entirety of the outside of each unit cell.

The outside of each unit cell may include sides, a top, a front, and a rear.

Ends of the separator plate may extend such that the separator plate has a length larger than the size of the cathode plate and the anode plate, i.e. the horizontal length or the vertical length. The extending ends of the separator may be connected to each other by thermal welding.

The fixing member may be a portion of the separator plate constituting the first unit cell to the fourth unit cell. In this case, the ends of the separator plate may be thermally welded to fix the first unit cell to the fourth unit cell. However, the present invention is not limited thereto.

The fixing member may include all members that are capable of fixing the first unit cell or the second unit cell.

In a case in which the stacked type unit cell is configured to include the first unit cell and the second unit cell, it possible to improve productivity and yield as compared with the stacked type electrode assembly configured to have a structure in which the cathode plate, the anode plate, and the separator plate are simply stacked.

In addition, the cathode plate, the separator plate, and the anode plate are laminated in unit of the first unit cell, and therefore, it is possible to minimize expansion in volume of the stacked type electrode assembly due to swelling.

In a case in which the stacked type electrode assembly is configured to include the first unit cell and the second unit cell, misalignment of the electrode assembly caused during a folding process is prevented and omission of processing equipment is possible. Also, it is possible to form the first unit cell or the second unit cell using only one laminator. In addition, it is possible to manufacture the stacked type electrode assembly by simple stacking. Consequently, damage to electrodes caused during the folding process may be reduced and electrolyte wettability may be improved. Furthermore, a single-sided organic and inorganic composite separator, e.g. a safety reinforced separator (SRS), may be used as the separator plate exposed outside. Consequently, cell thickness may be decreased and, at the same time, processing cost may be reduced.

A curved portion 330 providing an asymmetric structure is formed at a portion of one side 311 of the electrode assembly 310 constituting the outer circumference of the electrode assembly 310.

The battery case 320 is configured to have a structure in which the inside of the battery case 320 corresponds to the curved portion 330. In addition, the battery case 320 is configured to have a structure in which the outside 321 of the battery case 320 corresponds to the curved portion 330. The battery cell 300 with the above-stated construction is identical in structure to the battery cell 100 of FIG. 2 except for the outside 321 of the battery case 320, and therefore, a detailed description thereof will be omitted.

The battery cell 300 may be manufactured by placing the electrode assembly 310 in the battery case 320 such that the curved portion 330 of the electrode assembly 310 corresponds to a portion of one side 311 of the battery case 320 constituting the outer circumference of the battery case 320, impregnating the electrode assembly 310 with an electrolyte, and hermetically sealing the battery case 320 according to the conventional manufacturing method of FIG. 1. In the same manner as the receiving part (not shown) of the battery case 120 of FIG. 2, a receiving part (not shown) of the battery case 320 is formed so as to correspond to the curved portion 330 of the electrode assembly 310. After the battery case 320 is hermetically sealed, the outside 321 of the battery case 320 may be formed through a process of cutting the battery case 320 so that the outside of the battery case 320 corresponds to the curved portion 330.

Referring to FIG. 5, a battery cell 400 is a battery cell configured to have a structure in which an electrode assembly 410 of a structure including a cathode, an anode, and a separator disposed between the cathode and the anode is mounted in a pouch-shaped battery case 420. Generally, the battery cell 400 is configured to have a plate-shaped structure in plane.

A curved portion 430 providing an asymmetric structure is formed at neighboring first and second sides 411 and 412 of the electrode assembly 410 constituting the outer circumference of the electrode assembly 410.

The battery case 420 is configured to have a structure in which the inside of the battery case 420 corresponds to the curved portion 430. In addition, the battery case 420 is configured to have a structure in which the outside 421 of the battery case 420 corresponds to the curved portion 430. The battery cell 400 with the above-stated construction is identical to what was described with reference to FIG. 2.

The plate-shaped battery cell 100 according to the present invention is configured such that the surface area of one electrode is smaller than that of another electrode.

Figure 8A:
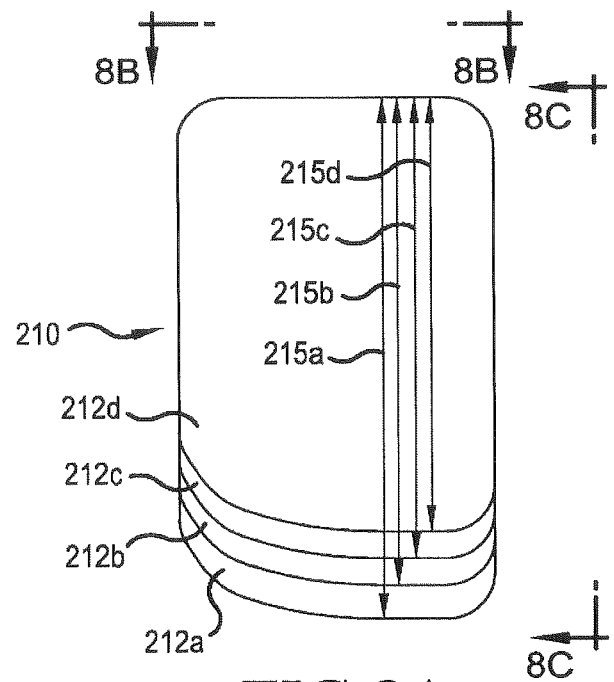
FIGS. 8A to 8C are views respectively showing the bottom, the end, and the side of an electrode assembly according to another embodiment of the present invention.
Figure 8B:
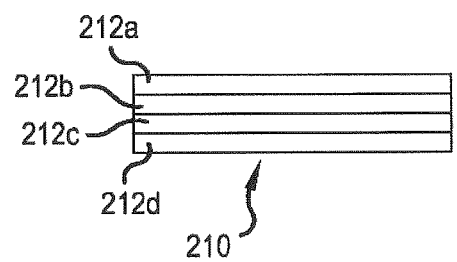
Figure 8C:
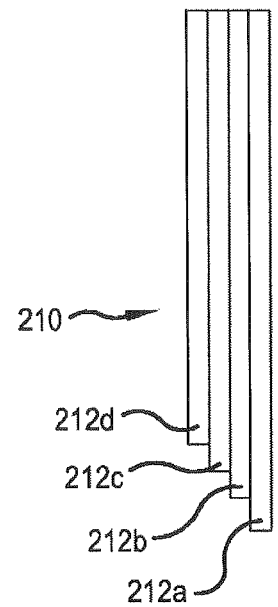
Figure 9A:
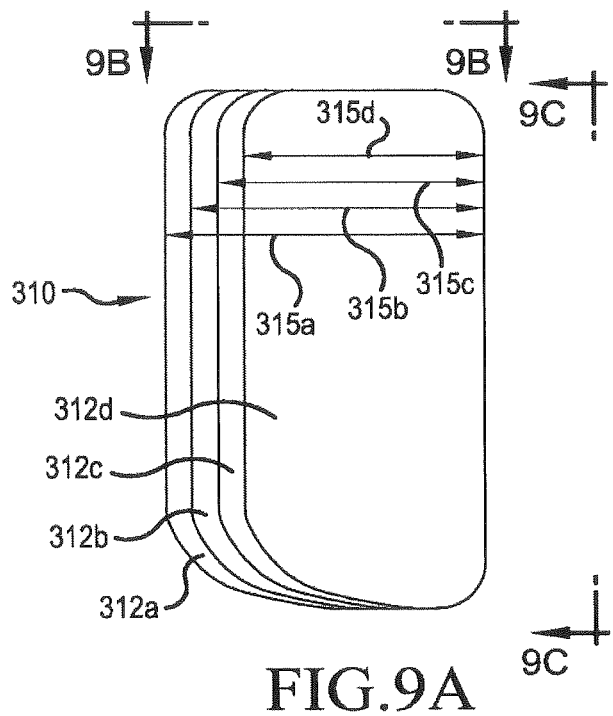
FIGS. 9A to 9C are views respectively showing the bottom, the end, and the side of an electrode assembly according to another embodiment of the present invention.
Figure 9B:
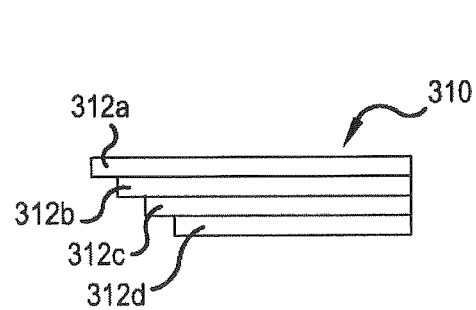
Figure 9C:
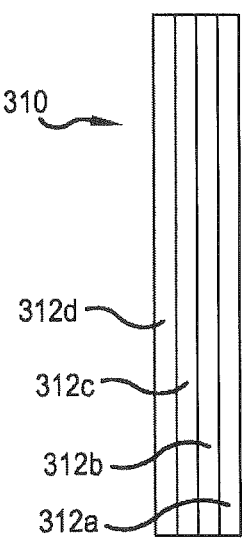
Figures 10A, 10B, 10C:
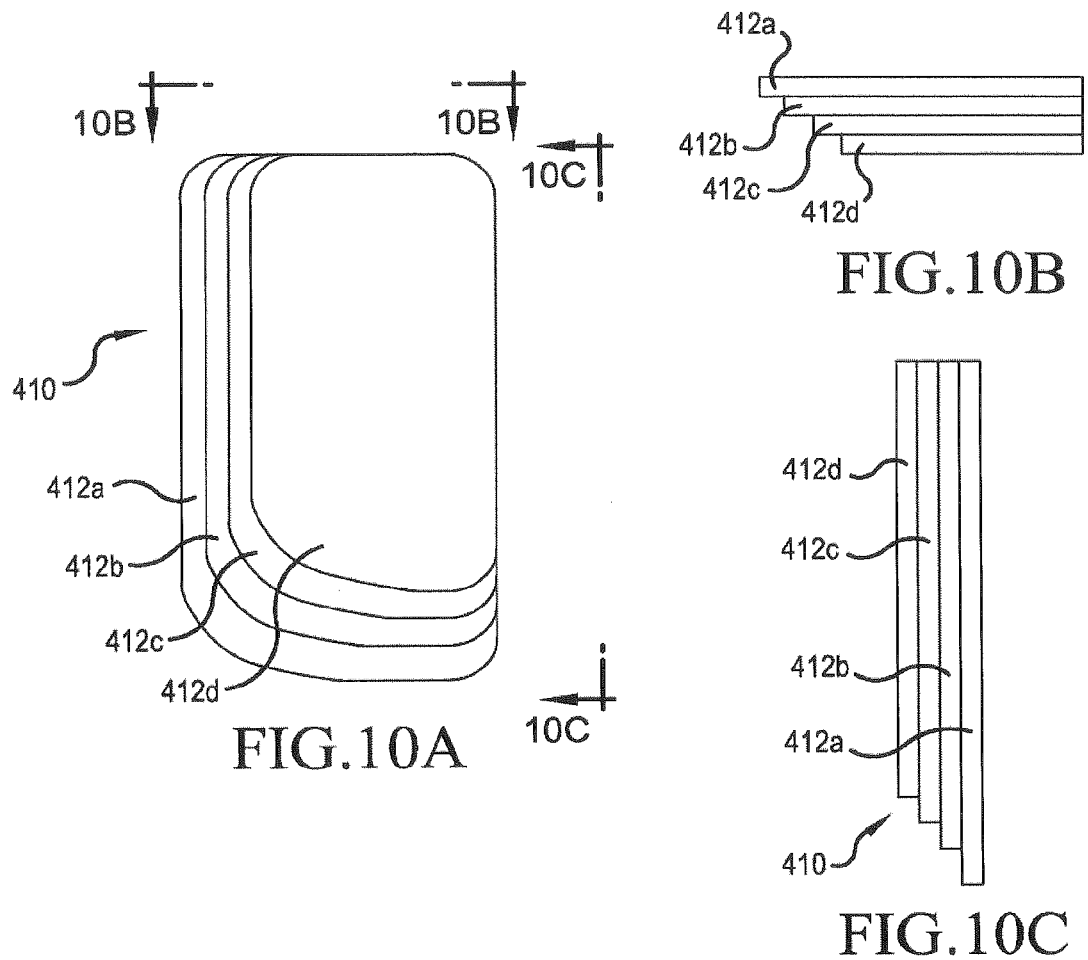
FIGS. 10A to 10C are views respectively showing the bottom, the end, and the side of an electrode assembly according to a further embodiment of the present invention.

FIGS. 8A to 8C are typical views respectively showing the bottom, the end, and the side of an electrode assembly according to another embodiment of the present invention, FIGS. 9A to 9C are typical views respectively showing the bottom, the end, and the side of an electrode assembly according to another embodiment of the present invention, and FIGS. 10A to 10C are typical views respectively showing the bottom, the end, and the side of an electrode assembly according to a further embodiment of the present invention.

Referring first to FIGS. 8A to 8C, an electrode assembly 210 includes electrodes 212a, 212b, 212c, and 212d. The electrodes 212a, 212b, 212c, and 212d are sequentially stacked such that the surface areas of the electrodes 212a, 212b, 212c, and 212d are gradually decreased from the top to the bottom of the electrode assembly 210. In other words, the electrodes 212a, 212b, 212c, and 212d are sequentially stacked such that the surface areas of the electrodes 212a, 212b, 212c, and 212d are gradually increased from the bottom to the top of the electrode assembly 210. Referring to FIG. 8A, which shows the bottom of the electrode assembly 210, a portion of the electrode 212a is exposed from the rear (or the front) of the electrode 212b, from which the change in surface area of the electrodes can be seen. This relationship may be equally applied to successive pairs of electrodes 212. As shown in FIG. 8A, corners of the electrodes opposite to the corners having asymmetric portions are similar and are arranged in the vertical direction of the electrode assembly 210. According to the present invention, other asymmetric portions may be formed at other areas of the electrode assembly 210.

FIG. 8B shows the electrode assembly 210 based on a vertical section 8B-8B, from which it can be seen that the electrodes 212 have the same width. FIG. 8C shows the electrode assembly 210 based on a vertical section 8C-8C, from which it can be seen that the electrodes 212 have different lengths.

The electrodes 212a to 212d have the maximum lengths 215a to 215d. The maximum lengths 215a to 215d are shown from the vertical plane of the electrode assembly 210 in the horizontal direction. The maximum lengths 215a to 215d of the successively stacked electrodes 212a to 212d are configured such that the maximum lengths 215a to 215d are decreased along a vertical axis in the direction in which the stacked electrodes 212a to 212d are gradually distant from a cover.

An electrode assembly including electrodes 312a to 312d is shown in FIGS. 9A to 9C. Similarly to the electrodes 212a to 212d, the electrodes 312a to 312d are sequentially stacked such that the surface areas of the electrodes 312a to 312d are gradually decreased from the top to the bottom of the electrode assembly 310.

The electrodes 312a to 312d have the maximum widths 315a to 315d. As shown in the vertical plane 114 of FIG. 2, the maximum widths 315a to 315d are formed in the direction perpendicular to the vertical plane of the electrode assembly 310. The maximum lengths 315a to 315d of the successively stacked electrodes 312a to 312d are configured such that the maximum lengths 215a to 215d are decreased along a vertical axis in the direction in which the stacked electrodes 312a to 312d are gradually distant from a cover.

Referring first to FIGS. 10A to 10C, an electrode assembly 410 includes electrodes 412a to 412d. The arrangement of the electrodes 412a to 412d is similar to that of the electrodes 212a to 212d and the electrodes 312a to 312d in that the surface areas of the sequentially stacked electrodes 412a to 412d are gradually decreased from the top to the bottom of the electrode assembly 410. The electrodes 412a to 412d have the maximum lengths and the maximum widths, which are related to the electrode assemblies 210 and 310. The maximum lengths and the maximum widths of the successively stacked electrodes 412a to 412d are configured such that the maximum lengths 215a to 215d are decreased along a vertical axis in the direction in which the stacked electrodes 412a to 412d are gradually distant from a cover. The lengths and widths of the electrodes 412 can be seen from FIGS. 10B and 10C.

In a case in which n electrode groups having different stack areas are stacked, the stepped structure may have n steps, where, n is a natural number equal to or greater than 2 and may be properly adjusted in consideration of the capacity of a device or the curvature of the outside of the device.

FIGS. 6 and 6A to 6E are typical views showing a battery cell manufacturing method according to the present invention.

Referring to these drawings, a battery cell 500 is manufactured by cutting an unfolded battery case form 520 from a laminate sheet (not shown) to manufacture a battery case 550, placing an electrode assembly 561 in the battery case 550, and sealing the outer circumference of the battery case 550 using a thermal welding method.

The unfolded battery case form 520 is cut from the laminate sheet (not shown) such that the unfolded battery case form 520 has a size corresponding to a width W and a length L of the finished battery cell 500. Specifically, the unfolded battery case form 520 includes two unit forms 521 and 522 symmetric with respect to a central axis 523. Each of the two unit forms 521 and 522 is formed to have a size corresponding to the width W and the length L of the finished battery cell 500.

The unfolded battery case form 520 cut from the laminate sheet (not shown) is folded as indicated by reference numeral 531 such that the two unit forms 521 and 522 symmetric with respect to the central axis 523 overlap each other.

External force is applied as indicated by reference numeral 542 to a folded portion 541 of the folded battery case form 520 from the inside to the outside of the folded portion 541 using a deep drawing method to form a curved portion 543 corresponding to a deflection part of one side of the electrode assembly 561.

Subsequently, external force is applied as indicated by reference numeral 551 to the inside of the battery case 550 using the deep drawing method to form a receiving part 552, and the electrode assembly 561 is placed in the receiving part 552.

Finally, the outer circumference of the battery case 550 is hermetically sealed as indicated by reference numeral 562 using a thermal welding method to complete a battery cell 500 including curved portions 543 and 552 and having a width W and a length L. As previously described, contact between the upper side outer circumference of the battery case 550 and the bottom of the laminate sheet is not achieved due to bending of one side of the battery case 550. Specifically, the top and the bottom of the laminate sheet do not contact each other although the top and the bottom of the laminate sheet are adjacent to each other. The top and the bottom of the laminate sheet are connected to each other by welding.

Figure 7:
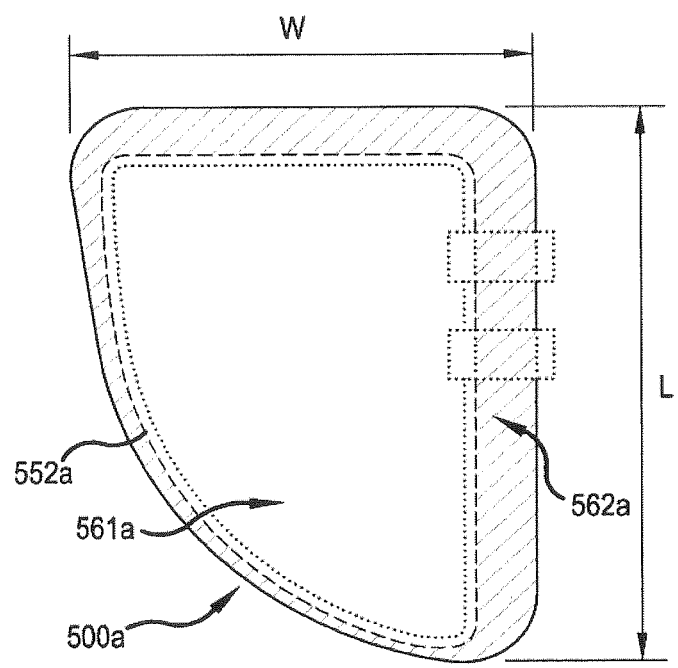
FIG. 7 is a plan view showing a battery cell having tabs formed at different positions according to the present invention.

FIG. 7 is a plan view typically showing a battery cell having tabs formed at different positions according to the present invention.

The battery cell according to the present invention, the tabs of which are formed at different positions, is shown in FIG. 7.

Figure 6:
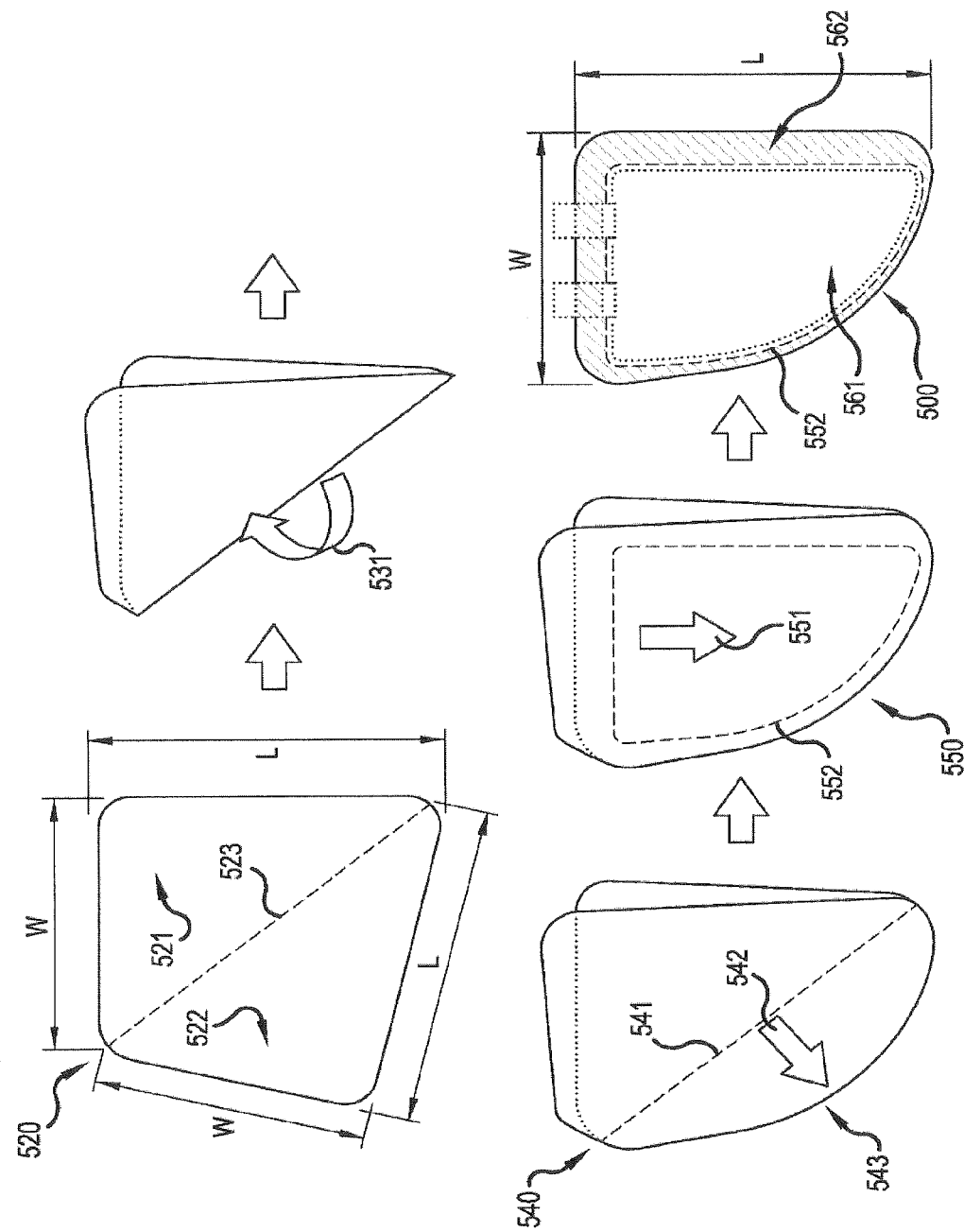
FIGS. 6 and 6A to 6E are typical views showing a battery cell manufacturing method according to the present invention.
Figure 6A:
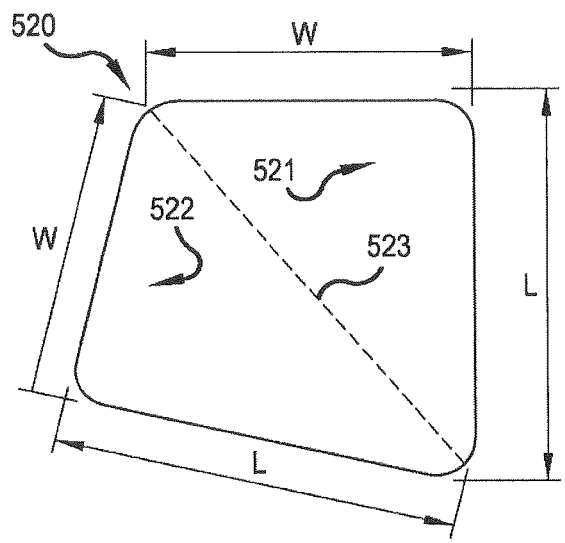
Figure 6B:
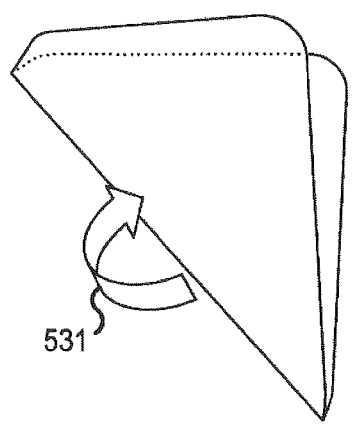
Figure 6C:
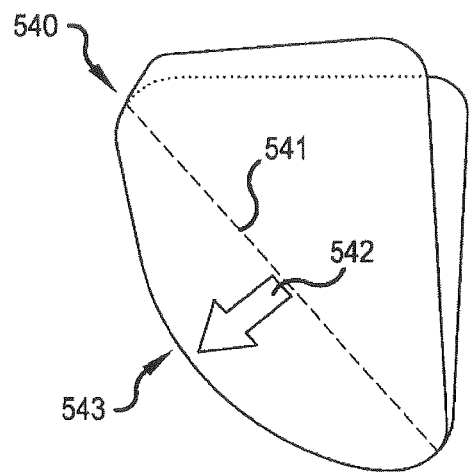
Figure 6D:
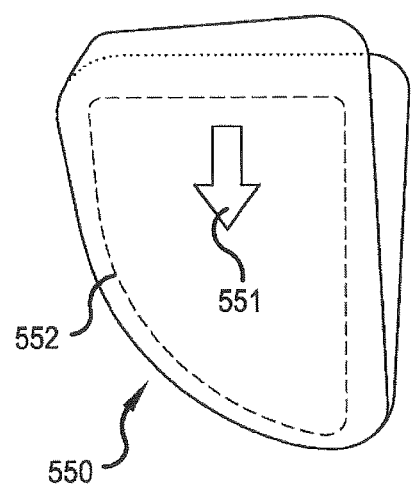
Figure 6E:
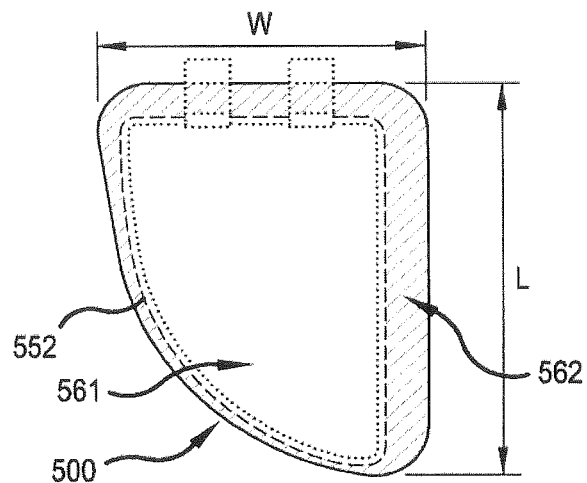

As compared with the battery cell 500 shown in FIG. 6E, a battery cell 500a of FIG. 7 includes tabs or electrode terminals located at one side thereof, at which a length L of the battery cell 500a is shown. The tabs are located at a thermally welded portion of the battery cell 500a distant from a bent part of a curved portion 552a. During manufacture of the battery cell 500a, gas may be trapped in the battery cell 500a before the battery cell 500a is thermally welded, i.e. in the battery cell 500a which is not sealed.

In a case in which the tabs are located distant from the bent part of the curved portion, the tabs may be fixed at the final positions thereof during a folding and deep drawing process of a battery case. The tabs may be fixed along a portion of the battery cell 500a which is initially thermally welded. A portion W of the battery cell 500a may not be sealed before a final step. Before sealing the battery cell 500a, undesired gas may be removed through an unsealed portion of the battery cell 500a. The tabs are preferably located as shown in FIG. 7. During removal of undesired gas, direct contact between the gas and the tabs may be avoided. Contact between the gas and the tabs may corrode the tabs, which may deteriorate efficiency of the completed battery cell 500a.

The tabs of the battery cell may be located at specific positions based on the final structure of the battery cell and a method of manufacturing the battery cell having the maximum efficiency.

Figure 11:
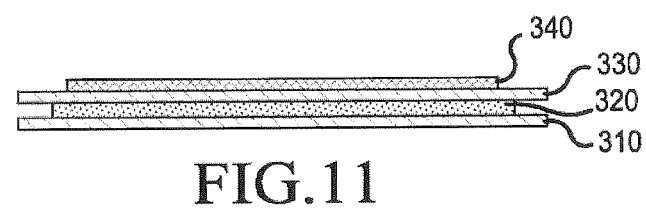
FIG. 11 is a view showing the structure of a first electrode group according to an embodiment of the present invention.

As shown in FIG. 11, a first electrode group is configured to have a structure in which a separator plate 310, a cathode plate 320, a separator plate 330, and an anode plate 340 are laminated while being sequentially stacked.

Figure 12:
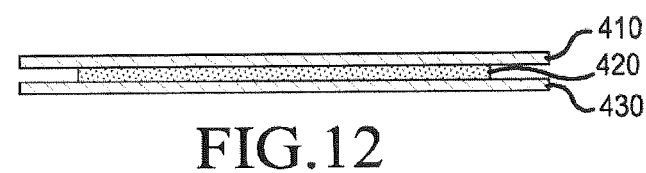
FIG. 12 is a view showing the structure of a second electrode group according to an embodiment of the present invention.

As shown in FIG. 12, a second electrode group is configured to have a structure in which a separator plate 410, an anode plate 420, and a separator plate 430 are laminated while being sequentially stacked.

Figure 13:
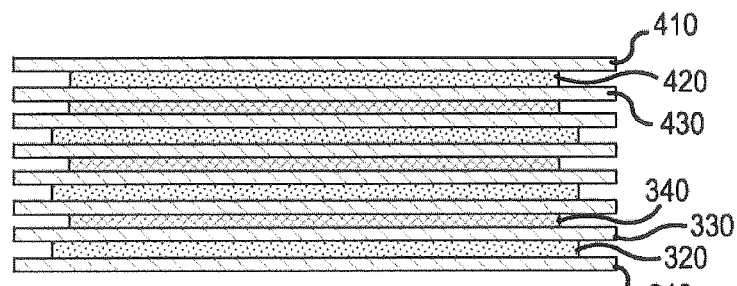
FIG. 13 is a typical view showing a stacked type electrode assembly according to an embodiment of the present invention.

FIG. 13 shows a stacked type electrode assembly configured to have a structure in which the second electrode group of FIG. 12 is stacked on the uppermost end of a first electrode group stack constituted by first electrode groups, one of which is shown in FIG. 11.

Figure 14:
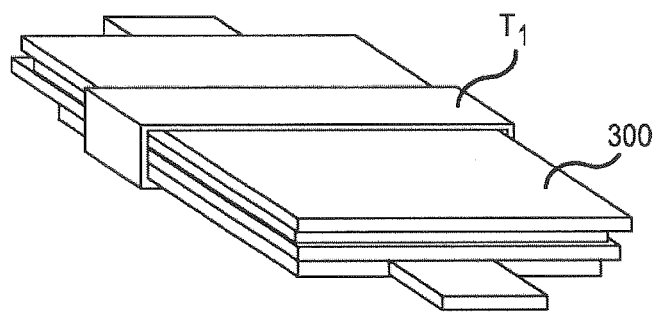
FIG. 14 is a typical view showing a fixing structure of the first electrode group of FIG. 11.
Figure 14:
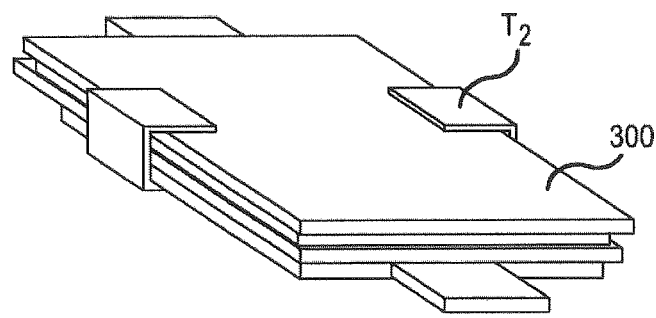

FIG. 14 shows an embodiment in which a fixing member $T_1$ is added to the first electrode group of FIG. 11. Specifically, the fixing member $T_1$ is added to the side or the front of the first electrode group 300.

In order to secure stack stability of a simple stack structure, an additional fixing member may be added to the side of the stack structure to fix the stack structure. The fixing member may be realized as a tape $T_1$ surrounding the entire surface of the first electrode group 300 as shown in FIG. 14(a). Alternatively, the fixing member may be realized as a fixing member $T_2$ to fix only each side of the electrode group 300 as shown in FIG. 14(b).

Figure 15:
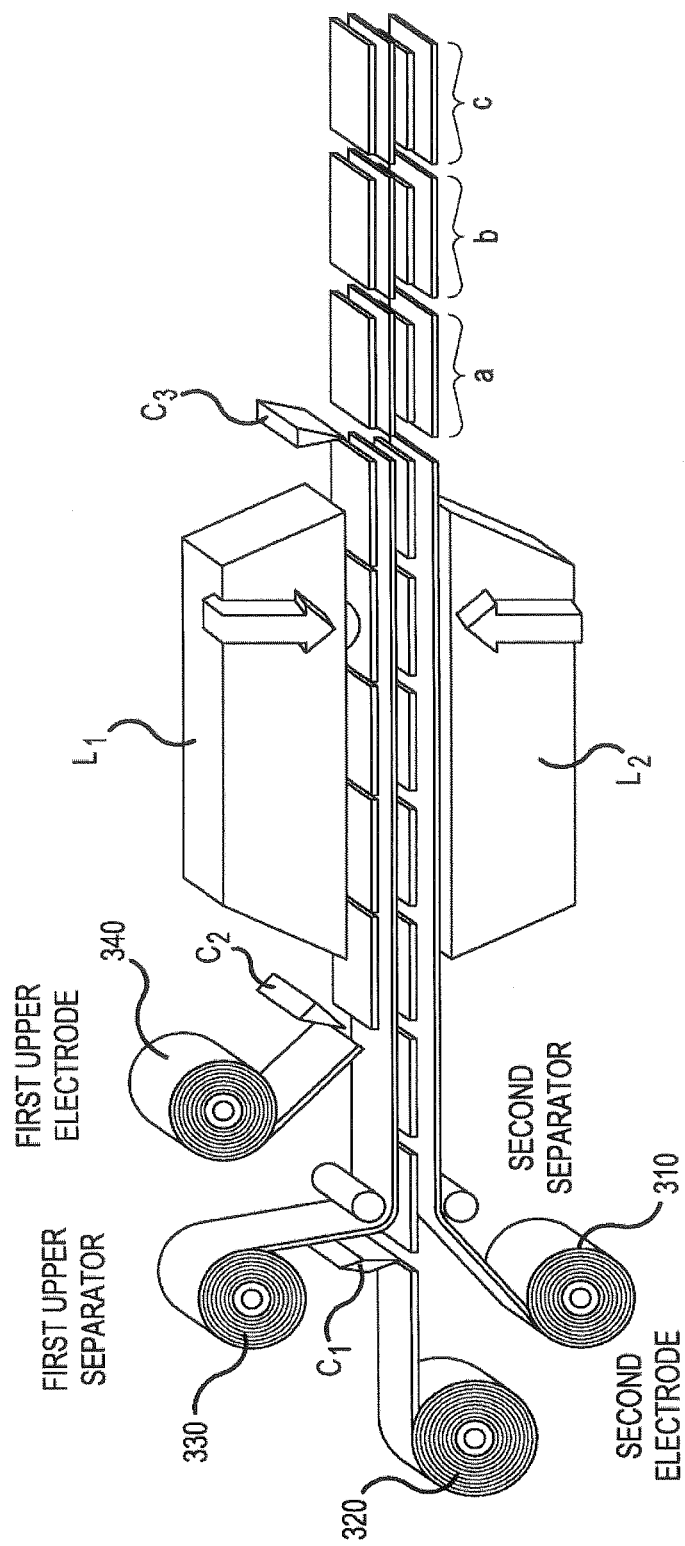
FIG. 15 is a view showing a process of manufacturing a first electrode group according to an embodiment of the present invention.

FIG. 15 is a view typically showing a process of manufacturing the first electrode group according to the present invention.

As shown in FIG. 15, materials for a separator plate 310, a cathode plate 320, a separator plate 330, and an anode plate 340 are simultaneously loaded (using sheet type loading units). The material for the cathode plate 320, which is used as a middle layer, is cut into a designed size and is then loaded into laminators $L_1$ and $L_2$.

Subsequently, the materials for the separator plates 310 and 330, which are disposed under and above the material for the cathode plate 320, are simultaneously loaded into the laminators $L_1$ and $L_2$. At the same time, the material for the anode plate 340 is loaded into the laminators $L_1$ and $L_2$.

Subsequently, the laminators $L_1$ and $L_2$ form a structural body in which the two electrode plates and the two separator plates are laminated to each other using heat and pressure, i.e. a first electrode group. Subsequently, a cutter $C_3$ cuts the structural body into a plurality of first electrode groups. Afterwards, various inspection processes, such as a thickness inspection (a), a vision inspection (b), and a short circuit inspection (c), may be performed with respect to each first electrode group.

Subsequently, each first electrode group manufactured as described above is fixed using a fixing member, and the first electrode groups are stacked to constitute a structural body in which the first electrode groups are stacked. Subsequently, the second electrode group shown in FIG. 12 is stacked on the structural body and then the second electrode group and the structural body are fixed using a fixing member, thereby completing a stacked type electrode assembly.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a battery cell, the method comprising the steps of:
   cutting a laminate sheet comprising a metal layer and a resin layer into an unfolded battery case form to prepare a battery case sheet;
   folding the battery case sheet with respect to a symmetrical axis to form a folded portion;
   applying external force to the folded portion from an inside to an outside of the folded portion to form a curved portion corresponding to a deflection part of one side of an asymmetric electrode assembly;
   applying external force to an inside of the battery case sheet to form a receiving part;
   placing the asymmetric electrode assembly having the deflection part at one side thereof in the receiving part;
   connecting electrode terminals with the electrode assembly, the electrode terminals being located opposite the folded portion; and
   hermetically sealing the battery case sheet, including sealing the area at the location of the electrode terminals, thereafter purging gas from the battery case at an unsealed location, and thereafter sealing the unsealed location.

2. The method according to claim 1, wherein the unfolded battery case form corresponds to a shape of the battery case.

3. The method according to claim 1, wherein the external forces are applied using a deep drawing method.

4. The method according to claim 1, wherein the step of hermetically sealing is achieved using a thermal welding method.

5. The method according to claim 1, wherein at least a portion of the curved portion of the battery case is not thermally welded.

6. The method according to claim 1, wherein the asymmetric part is located at one of the sides of the battery case formed using the deep drawing method.

7. The method according to claim 1, further comprising a step of impregnating the electrode assembly with an electrolyte.

* * * * *